No. 628,483. Patented July 11, 1899.
F. MACRI.
SHEARS.
(Application filed Aug. 19, 1897.)
(No Model.) 2 Sheets—Sheet 1.
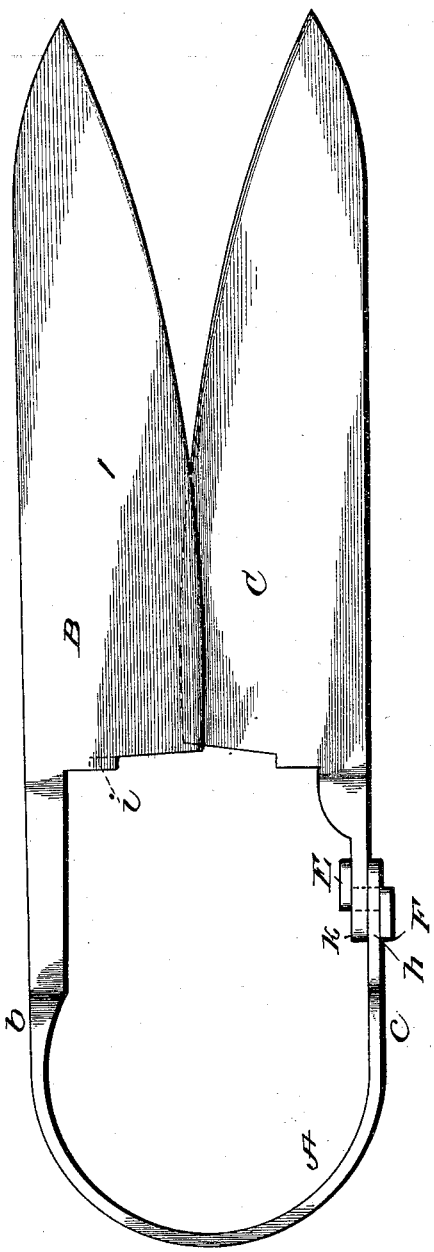
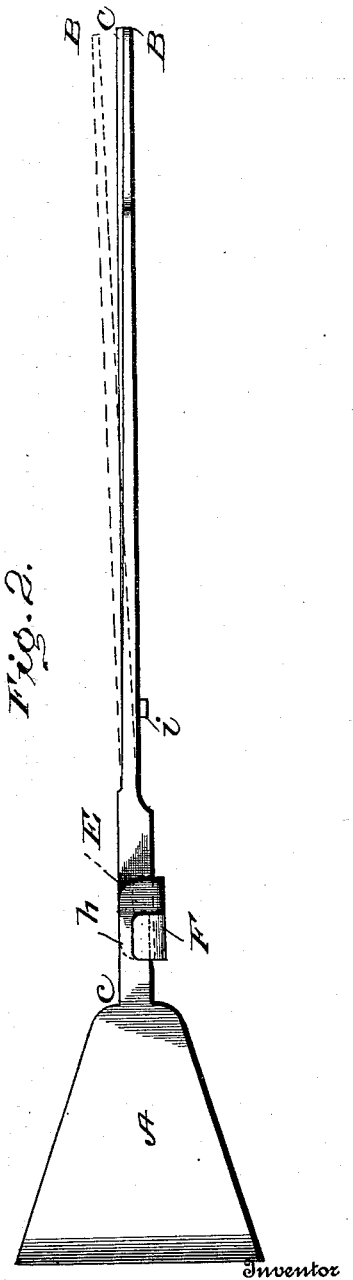
Witnesses
Inventor
Frank Macri
By his Attorneys No. 628,483. Patented July 11, 1899.
F. MACRI.
SHEARS.
(Application filed Aug. 19, 1897.)
(No Model.) 2 Sheets—Sheet 2.
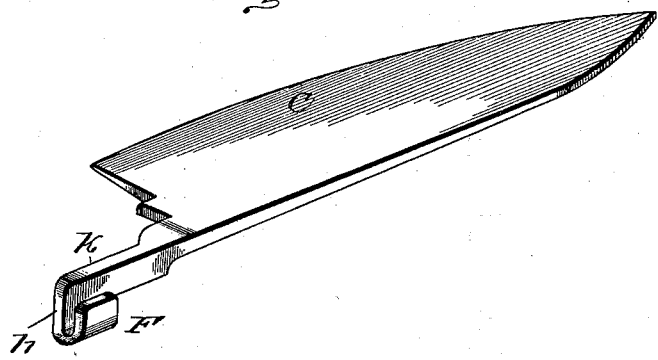
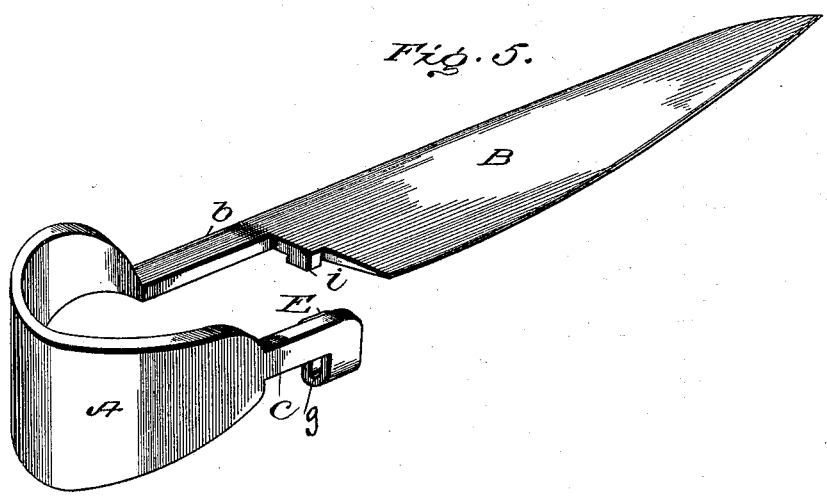
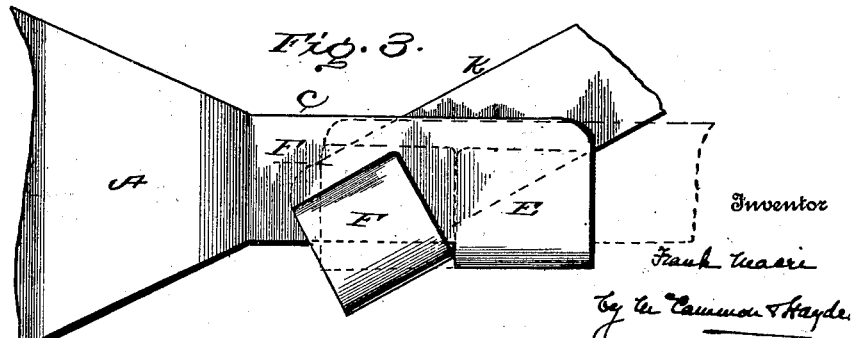

UNITED STATES PATENT OFFICE.

FRANK MACRI, OF HUNTINGTON, OREGON.

SHEARS.

SPECIFICATION forming part of Letters Patent No. 628,483, dated July 11, 1899.

Application filed August 19, 1897. Serial No. 648,765. (No model.)

*To all whom it may concern:*

Be it known that I, FRANK MACRI, of the town of Huntington, in the county of Baker and State of Oregon, have invented an Improvement in Shears; and I declare the following to be a full, clear, and exact description thereof.

My invention relates to shears which are constructed of two parts, each part including one of the blades.

It consists in providing a peculiar joint by which either of the parts may be joined to or detached from the other without the use of screws, bolts, or other equivalent devices. The advantage gained is that the two blades can readily be detached for the purpose of sharpening or making repairs and can as readily be joined together for use.

In the accompanying drawings, Figure 1 represents a plan of the shears; Fig. 2, an elevation; Fig. 3, an elevation showing, on a larger scale, the joint by means or which the two parts of the shears are detached and joined. It also indicates the manner in which this joint is operated. Figs. 4 and 5 are isometric projections of the parts of the shears when detached.

Throughout the drawings the same letter is used to indicate the same part of the device.

A represents a spring-bow which is provided with shanks or handles *b* and *c*.

B represents one of the blades of the shears, which is permanently joined to the spring-bow by the shank or handle *b*.

The shank or handle *c* at its end farthermost from the spring-bow A is fitted with the lip E, which extends inward, forming a perpendicular groove *g* of suitable size to accommodate the shank *k* of the blade C. The shank or handle *b*, the spring-bow A, and the shank or handle *c*, with its lip E, preferably should be made of one piece of metal, but may be made of two or more parts welded or otherwise permanently joined together. The blade C is fitted with the shank *k*, which at its extremity farthest from the blade C is fitted with a curved lip F, extending outward from the blade when in position as part of the shears. The lip F forms, with the side of the shank *k*, a perpendicular groove *h*, which is made of suitable size to fit the shank or handle *c*.

The two parts may be fitted together as follows: by placing the shank *k* longitudinally against the shank or handle *c*, so that the lip F shall engage the shank or handle *c*, which will then pass into the groove *h*, and the lip E shall engage the shank *k*, which will then pass into the groove *g* in the manner shown by Fig. 3. A joint is thus formed about which the two parts of the shears turn in a plane perpendicular to those of the blades. Either portion may then be turned until the shanks *k* and *c* come into proper alinement, as in Fig. 2. The lips E and F then come in contact with each other and prevent the shanks *k* and *c* from sliding lengthwise one upon the other. The blades B and C are made of such width as to overlap when joined together for use, as indicated by Fig. 1. The blade C is curved slightly upward from a point near that of its juncture with the shank *k*. The result of this is that when the shanks *b* and *c* have been brought in proper alinement the blade C is not in the same plane as the blade B. The two blades are then pressed outward and when free from contact are pressed perpendicularly past one another against the spring of the metal of which they are composed until they engage upon their opposite faces, as shown by Fig. 2. When thus engaged, the joint cannot rotate, and the blades are held firmly in a proper position for use. The two blades can be detached with equal readiness by a course the reverse of that by which they are attached.

Having thus described my invention, what I claim as new, and desire to secure by Letters Patent, is—

In a pair of shears composed of two distinct parts, the combination of the part consisting of the spring-bow A, provided with the handle or shank *b*, the blade B, the handle or shank *c*, the lip E, forming with the shank *c* the groove *g;* with the part consisting of the blade C, provided with the shank *k*, the lip F, forming with the shank *k* the groove *h;* which two said parts may be joined together and detached from one another by means of the joint produced by adjusting the shanks *c* and *k*, the grooves *g* and *h*, the lips E and F and the blades B and C, substantially as described.

In witness whereof I have hereunto set my hand.

FRANK MACRI.

Witnesses:
W. N. SHILLING,
OWEN EVANS.